United States Patent [19]

Hori et al.

[11] Patent Number: 4,628,612
[45] Date of Patent: Dec. 16, 1986

[54] TILT ANGLE DETECTION DEVICE

[75] Inventors: Nobuo Hori; Takashi Yokokura, both of Tokyo; Fumio Ohtomo, Saitama, all of Japan

[73] Assignee: Tokyo Kogaku Kikai Kabushiki Kaisha, Tokyo, Japan

[21] Appl. No.: 782,442

[22] Filed: Oct. 1, 1985

[30] Foreign Application Priority Data

Nov. 24, 1984 [JP] Japan .................. 59-248533

[51] Int. Cl.⁴ .................. G01C 9/06; G01C 9/26
[52] U.S. Cl. .................. 33/366; 33/379
[58] Field of Search .................. 33/366, 379; 340/689

[56] References Cited

U.S. PATENT DOCUMENTS

| | | | |
|---|---|---|---|
| 3,096,591 | 7/1963 | Higgins, Jr. et al. | 33/366 |
| 3,497,950 | 3/1970 | Squire et al. | 33/366 |
| 4,077,132 | 3/1978 | Erickson | 33/366 |
| 4,536,967 | 8/1985 | Beitzer | 33/366 |

FOREIGN PATENT DOCUMENTS

| | | | |
|---|---|---|---|
| WO83/01304 | 4/1983 | PCT Int'l Appl. | 33/366 |
| 756199 | 8/1980 | U.S.S.R. | 33/366 |
| 767507 | 9/1980 | U.S.S.R. | 33/366 |

*Primary Examiner*—Richard R. Stearns
*Attorney, Agent, or Firm*—Cushman, Darby & Cushman

[57] ABSTRACT

A level detector comprising a container holding two fluids. Four capacitors are formed between four electrodes disposed on one side of the container cooperating with an opposing common electrode. Two of the capacitors have a capacitance value influenced by the position of one of the fluids in the container (related to container tilt) but in inverse relationships. A third capacitor is influenced by the dielectric value of the two fluids but in a manner independent of the tilt angle of the container. The fourth capacitor has a capacitance value influenced only by the dielectric constant of one of the two fluids. Based on the four capacitance values, circuitry is provided for generating a signal relating to the angle of the container.

24 Claims, 8 Drawing Figures

TILT ANGLE DETECTION DEVICE

BACKGROUND OF THE INVENTION

1. Field of the Invention

This invention relates to tilt angle detection devices, and more particularly to electronic capacitance type tilt angle detection devices.

2. Description of the Prior Art

Devices have long been employed for determining the angle at which surfaces and the like are tilted. Typically, such devices have been manual, requiring an operator to examine the position of a bubble in a fluid filled tube to determine the tilt angle.

Attempts have also been made to generate some sort of electrical or electronic output from such a device indicative of a tilt angle. For example, U.S. Pat. No. 3,497,950 teaches positioning three electrodes in a container having a bubble and conductive fluid. Resistance values between the central electrode and the two end electrodes are monitored to produce a signal related to the position of the bubble.

Capacitive detection systems are also known as evidenced by U.S. Pat. Nos. 4,077,132 and 3,096,591. The '591 patent, for example, teaches a radio frequency leveling device including a container constructed of an insulating material filled with a liquid and a bubble. A common electrode is disposed on one side of the container and two separate electrodes are disposed on the other side of the container. The capacitance between the common electrode and one of the two electrodes is compared with a capacitance between the common electrode and the other of the two electrodes to provide an indication of the position of the bubble within the container.

Problems exist with such electronic level detection systems which render the output of such systems inaccurate. For example, the dielectric constants and volume of the fluid in the container are greatly dependent uppon ambient temperature. Thus, accurate measurements cannot be performed unless ambient temperature compensation is continuously provided. If data processing circuitry is employed to process the output signal of a detector so as to eliminate dependence upon ambient temperature, such circuitry tends to be complex.

SUMMARY OF THE INVENTION

The present invention provides a tilt sensor which overcomes these problems associated with the prior art. In the present invention, a container holds first and second fluids which are immiscible and have different dielectric constants. Four capacitors are then formed about the container. A first capacitor has both the first and second fluids acting as a dielectric material. The amount of the first fluid acting as dielectric material is related to the angle of the container. The second capacitor also has the first and second fluids as dielectric material. Similarly, the amount of the first fluid acting as a dielectric material is also related to the angle of the container; however, the relationship is inverse to that of the first capacitor. A third capacitor has both the first and second fluids as dielectric material in a manner which is independent of the angle of the container and a fourth capacitor has only the second fluid as the dielectric material. Circuitry is provided for monitoring the capacitance of each of the first through fourth capacitors and producing a signal related to the angle of the container.

The first fluid may be a bubble in the second fluid. The first through fourth capacitors may each be formed with electrodes on opposite sides of the container. In fact, each of the capacitors may include a single common electrode.

Where the first fluid is a bubble in the second fluid, the third capacitor may include electrodes between which the bubble always resides. The first and second capacitors may be formed with electrodes on opposite sides of the third capacitor such that the bubble partially extends between the electrodes of each of these capacitors, depending upon the angular position of the container. The fourth capacitor may include electrodes between which the bubble is never disposed in the given measuring range. Also, the fourth capacitor may include electrodes to one side or the other of the first and second capacitors or, in fact, may be split so that electrode portions reside on both sides of the first and second capacitors.

Alternately, the level detector according to this invention may include two containers. The first and second capacitors may be disposed on one of the containers and the third and fourth capacitors may be disposed on the other container.

In order to generate a signal related to the angle of the container, a capacitance controlled oscillator may be employed. Circuitry may be provided for connecting each of the first through fourth capacitors sequentially with the oscillator. Then, the period of the output signal from the oscillator is determined as an indication of the capacitance value of each capacitor. From these capacitance values, an indication of the tilt angle is generated.

BRIEF DESCRIPTION OF THE DRAWINGS

These and other objects and advantages of this invention will become more apparent and more readily appreciated from the following detailed description of the presently preferred exemplary embodiments, taken in conjunction with the accompanying drawings of which.

DETAILED DESCRIPTION OF THE PRESENTLY PREFERRED EXEMPLARY EMBODIMENTS

Figure 1:
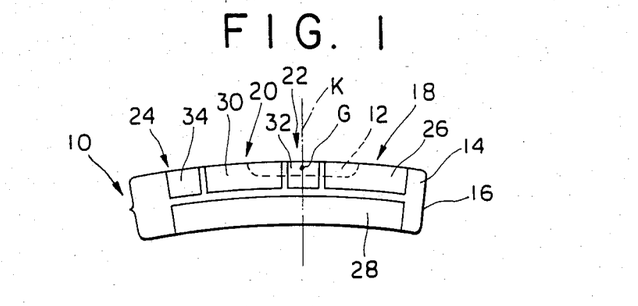
FIG. 1 is an end view of one embodiment of the container of the present invention.
Figure 2:
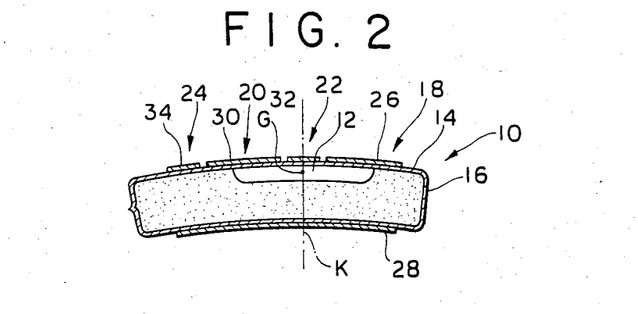
FIG. 2 is a longitudinal sectional view of the container of FIG. 1.

In FIGS. 1 and 2, tilt angle sensor 10 includes a first fluid 12 and a second fluid 14 disposed in a container 16. In the preferred embodiment, fluid 12 is an air bubble and fluid 14 is a properly viscous fluid such as alcohol, ether, etc. The center of air bubble 12 is denoted as G.

Container 16 has a convex surface and may, in fact, be a portion of a toroidal tube. Symbol K represents the reference axis of container 16.

Disposed about tube 16 are capacitors 18, 20, 22, and 24. Capacitor 18 includes electrode 26 and common electrode 28 with air bubble 12 and fluid 14 disposed therebetween as a dielectric. Capacitor 20 includes electrode 30 and common electrode 28 with air bubble 12 and fluid 4 disposed therebetween as dielectric material. The capacitance values of capacitors 18 and 20 depend upon the extent to which air bubble 12 is between their respective electrodes, which, in turn, is dependent upon the angle of container 16. Thus, the capacitance of capacitors 18 and 20 are both dependent upon the angle of container 16 except that the relationship of capacitance to container angle for capacitor 18 is inverse to the same relationship for capacitor 20.

Capacitor 22 includes electrode 32 and common electrode 28. As a result of the design of container 16 with respect to the size of air bubble 12, the same amount of air is always disposed between electrodes 32 and 28. Therefore, the capacitance of capacitor 22, although related to the dielectric constant of bubble 12 and fluid 14, is independent of the tilt angle of container 16. Capacitor 24 includes electrode 34 and common electrode 18. Container 16 and air bubble 12 are so designed that air bubble 12 is never disposed between electrodes 34 and 28 during actual use. Therefore, the capacitance of capacitor 24 is independent of the tilt angle of container 16 and relies solely upon fluid 14 as its dielectric.

Instead of using common electrode 28, capacitors 18, 20, 22, and 24 may have electrodes disposed on opposite sides of container 16 which correspond to electrodes 26, 30, 32, and 34, respectively.

Figure 3:
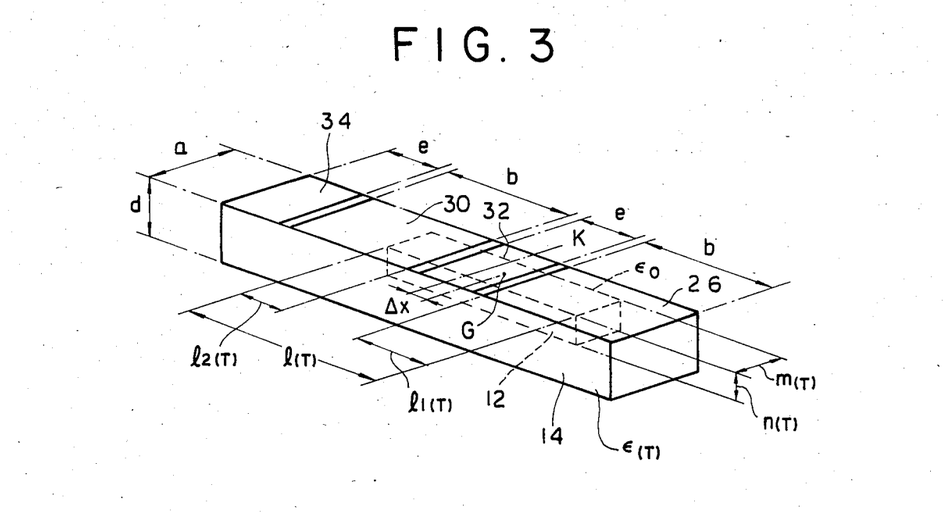
FIG. 3 is a diagrammatical representation of the container of the present invention useful for calculating purposes.

To determine the capacitances of capacitors 18 through 24, it is useful to model container 16 as illustrated in FIG. 3, as a rectangle with air bubble 12 also being represented as a rectangle. FIG. 3 illustrates the following dimensions:

a is the width of each of electrodes 26, 28, 30, 32, and 34;
b is the length of each of electrodes 26 and 30;
d is the distance between electrode 28 and electrodes 26, 30, 32, and 34;
e is the length of each of electrodes 32 and 34;
$l(T)$ is the length of air bubble 12 which is a function of temperature T;
$l_1(T)$ is the length of the portion of air bubble 12 which overlaps with electrode 26 and is a function of temperature T;
$l_2(T)$ is the length of the portion of air bubble 12 which overlaps with electrode 30, and is a function of temperature T;
$m(T)$ is the width of air bubble 12 which is a function of temperature T; and
$n(T)$ is the thickness of air bubble 12 which is a function of temperature T.

Also with respect to FIG. 3:
$\epsilon 0$ is the dielectric constant of air bubble 12;
$\epsilon(T)$ is the dielectric constant of fluid 14 which is a function of temperature T;
$\Delta x$ is the distance between G and K;
$C_1$ is the capacitance value of capacitor 18;
$C_2$ is the capacitance value of capacitor 20;
$C_3$ is the capacitance value of capacitor 22;
$C_4$ is the capacitance value of capacitor 24; and
R is the curvature radius of the upper inner wall of container 16.

The electric capacitance of a simple parallel plate capacitor is:

$$C = \frac{\epsilon A}{d}$$

where:
$\epsilon$ is the dielectric constant;
d is the distance between plates; and
A is the area of each plate.

With reference to FIG. 3, the electric capacitance values $C_1$ and $C_2$ are as follows:

$$C_1 \simeq \frac{\epsilon(T)}{d} S_1 + \frac{\epsilon 0 \, \epsilon(T)}{\{d - n(T)\} \epsilon 0 + n(T) \epsilon(T)} S_2 = \quad (1)$$

$$m(T) \left[ \frac{\epsilon 0 \, \epsilon(T)}{\{d - n(T)\} \epsilon 0 + n(T) \epsilon(T)} - \frac{\epsilon(T)}{d} \right] l_1(T) +$$

$$\frac{\epsilon(T)}{d} ab$$

where:
$S_1 = ab - m(T)l_1(T)$ and
$S_2 = m(T)l_1(T)$, and $$C_2 \simeq m(T) \left[ \frac{\epsilon 0 \, \epsilon(T)}{\{d - n(T)\} \epsilon 0 + n(T) \epsilon(T)} - \frac{\epsilon(T)}{d} \right] l_2(T) + \quad (2)$$

$$\frac{\epsilon(T)}{d} ab$$

The difference between capacitance values $C_1$ and $C_2$ is:

$$C_1 - C_2 \simeq \quad (3)$$

$$m(T) \, \epsilon(T) \left[ \frac{\epsilon 0}{\{d - n(T)\} \epsilon 0 + n(T) \epsilon(T)} - \frac{1}{d} \right] \times$$

$$\{l_1(T) - l_2(T)\}$$

The following equations are derived from the definitions:

$$l_1(T) - l_2(T) = 2\Delta x \quad (4)$$

$\Delta x = R \sin \theta \simeq R\theta$ (where $\theta$ is the tilt angle of container 16) (5)

From equations (3), (4), and (5), $(C_1 - C_2)$ is given by:

$$C_1 - C_2 \simeq \quad (6)$$

$$m(T) \, \epsilon(T) \left[ \frac{\epsilon 0}{\{d - n(T)\} \epsilon 0 + n(T) \epsilon(T)} - \frac{1}{d} \right] 2R\theta$$

Electric capacitance values $C_3$ and $C_4$ are as follows:

$$C_3 \simeq \frac{\epsilon(T)}{d} S_3 + \frac{\epsilon 0 \, \epsilon(T)}{\{d - n(T)\} \epsilon 0 + n(T) \epsilon(T)} S_4 \quad (7)$$

$$= \frac{\epsilon(T)}{d} \{a - m(T)\} e + \frac{\epsilon 0 \, \epsilon(T)}{\{d - n(T)\} \epsilon 0 + n(T) \epsilon(T)} m(T)e$$

where: $S_3 = \{a - m(T)\}e$ and $S_4 = m(T)e$ $$C_4 \approx \frac{\epsilon(T)}{d} ae \qquad (8)$$

Note that capacitance values $C_3$ and $C_4$ are not dependent on the tilt angle $\theta$ in the measurement range. From equations (7) and (8), difference between capacitances $C_3$ and $C_4$ is:

$$C_3 - C_4 \approx \frac{-\epsilon(T)}{d} m(T)e + \qquad (9)$$

$$\frac{\epsilon 0 \, \epsilon(T)}{\{d - n(T)\} \epsilon 0 + n(T) \epsilon(T)} m(T)e =$$

$$-m(T)\epsilon(T)e \left[ \frac{1}{d} - \frac{\epsilon 0}{\{d - n(T)\} \epsilon 0 + n(T) \epsilon(T)} \right]$$

Dividing $(C_1 - C_2)$ by $(C_3 - C_4)$ results in:

$$\frac{C_1 - C_2}{C_3 - C_4} \approx \qquad (10)$$

$$\frac{-2m(T)\epsilon(T)R \left[ \frac{1}{d} - \frac{\epsilon 0}{\{d - n(T)\} \epsilon 0 + n(T) \epsilon(T)} \right] \theta}{-m(T)\epsilon(T)e \left[ \frac{1}{d} - \frac{\epsilon 0}{\{d - n(T)\} \epsilon 0 + n(T) \epsilon(T)} \right]} =$$

$$\frac{2R}{e} \cdot \theta$$

Therefore, tilt angle $\theta$ may be expressed as follows:

$$\theta = \frac{e}{2R} \cdot \frac{(C_1 - C_2)}{(C_3 - C_4)} \qquad (11)$$

Equation (11) indicates that tilt angle $\theta$ may be determined independent of ambient temperature T based upon capacitance values $C_1$ through $C_4$.

Figure 4:
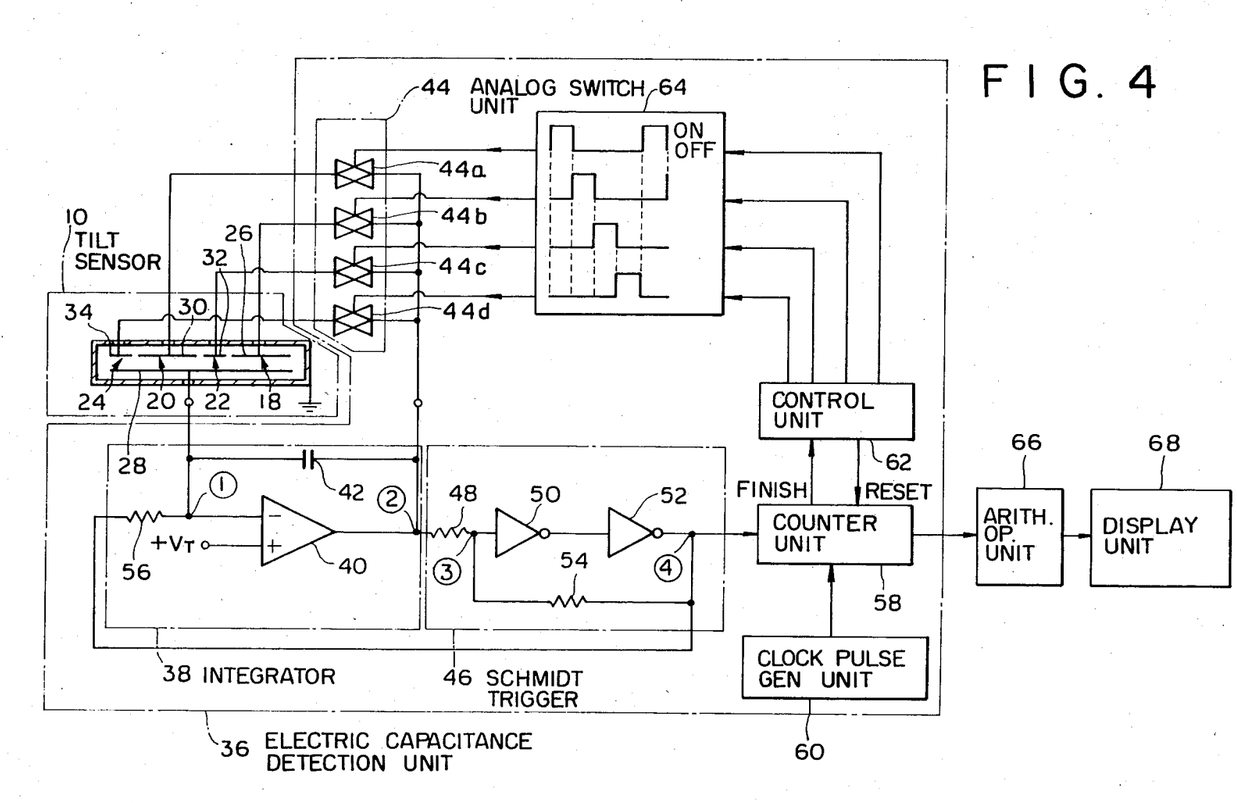
FIG. 4 schematically illustrates one embodiment of a signal processing circuit for the present invention.
Figure 5:
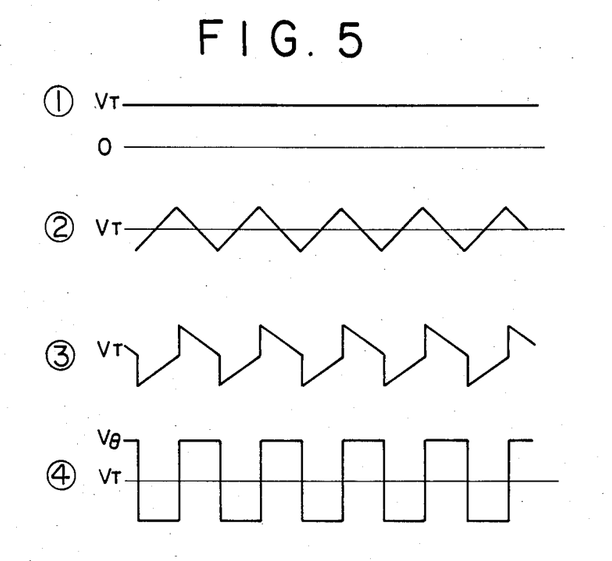
FIG. 5 illustrates waveforms useful in explaining the operation of FIG. 4.

Thus, all that is necessary is to determine the value of capacitances $C_1$ through $C_4$. A first embodiment for determining these capacitance values is illustrated in FIG. 4. Waveforms ① through ④ useful in explaining FIG. 4 are illustrated in FIG. 5.

Electrical capacitance detection unit 36 includes integrator 38. The active element of integrator 38 is operational amplifier 40. Connected to the non-inverting input of operational amplifier 40 is a reference voltage $V_T$ illustrated in FIG. 5. Connected across the inverting input of operational amplifier 40 and its output is capacitor 42. Connected in parallel with capacitor 42 are capacitors 18 through 24 connected through analog switch unit 44. Analog switch unit 44 includes analog switches 44a, 44b, 44c, and 44d which each may be energized to connect capacitors 18, 20, 22, and 24, respectively, in parallel with capacitor 42. The value of capacitor 42 is sufficiently large to improve linearity of the integration operation since capacitance values $C_1$ through $C_4$ are relatively small.

In the case that capacitors 18, 20, 22, and 24 have individual electrodes opposing to electrodes 26, 30, 32, and 34, respectively, such individual electrodes may be connected to the inverting input of operational amplifier 40 through an analog switch unit (not shown) which is the same in construction as analog switch unit 44 and is operable in synchronizm therewith.

The output of operational amplifier 40 is applied to Schmidt trigger circuit 46 which includes an input resistor 48 and inverters 50 and 52 connected in series. The output of inverter 52 is connected back through resistor 54 to the input of inverter 50 in a conventional manner. The output of inverter 52 is also connected to the inverting input of operational amplifier 40 through resistor 56. As a result of the connection from the output of inverter 52 to the input of operational amplifier 40, the input and the output of operational amplifier 40 are respectively a fixed voltage ① and a ramp voltage ② as illustrated in FIG. 5. Waveforms ③ and ④ at the input to inverter 50 and the output of inverter 52 are also illustrated in FIG. 5. An arithmetic mean value of the output of inverter 52 may be set to be substantially equal to reference voltage $V_T$ as further shown in FIG. 5. The value of the capacitance connected in parallel with capacitor 42 controls the rate of integration of operational amplifier 40. Therefore, the frequency of the output of inverter 52 is related to the value of the particular capacitances $C_1$ through $C_4$ connected by analog switch unit 44 in parallel with capacitor 42.

The pulse train produced by inverter 52 is applied to counter 58. Counter unit 58 counts clock pulses supplied from clock pulse generating unit 60 during the production of a fixed number of pulses (256 pulses, for example) from inverter 52. Clock pulse generating unit 60 must generate a clock pulse train whose repetition period is sufficiently short compared to the output train of inverter 52. Once 256 pulses have been received from inverter 52, counter unit 58 produces a finish signal which is applied to control unit 62.

Control unit 62 provides "on-off" control signals 64, as schematically illustrated in FIG. 4, to control analog switch unit 44. Thus, during a first time period, control unit 62 produces a pulse to cause analog switch 44a to become conductive. During a second time period, control unit 62 causes analog switch 44b to become conductive. During a third period, control unit 62 causes analog switch 44c to become conductive. During a fourth time period, control unit 62 causes analog switch 44d to become conductive. During the next time period, analog switch 44a again becomes conductive. Each time control unit 62 receives a finish signal from counter unit 58, it causes control unit 62 to advance to the next time period so that the next of capacitors 18 through 24 are connected in parallel with capacitor 42. Thus, in response to the "on-off" control signals from control unit 62, analog switches 44a through 44d sequentially connect electrodes 26, 30, 32, and 34 to the output of operational amplifier 40. The rising edge of each "on" control signal produced by control unit 62 is also applied to counter unit 58 as a reset pulse.

At the same time that counter unit 58 produces a finish signal for control unit 62, the count in counter unit 58 is transferred to arithmetic operation unit 66. Thus, in four consecutive counting periods, arithmetic operation unit 66 receives four numbers relating to the period of the pulse trains produced by integrator 38 and Schmidt trigger 46 with the four capacitors of tilt sensor 10 sequentially controlling. Therefore, each count output from counter unit 58, Ni, is proportional to $(C_0+C_i)$, i=1, 2, 3, 4, where $C_0$ is the capacitance of capacitor 42 and $C_i$ is the electric capacitance value of either capacitor 20, 18, 22 and 24, respectively, with each incremented value of i. That is, $Ni = K_2 (C_0+C_i)$, i=1, 2, 3, 4. $K_2$ is a constant.

Upon receiving the four capacitance values, arithmetic operation unit 66 carries out the following arithmetic operations:

$$\frac{N_1 - N_2}{N_3 - N_4} = \frac{K_2(C_0 + C_1) - K_2(C_0 + C_2)}{K_2(C_0 + C_3) - K_2(C_0 + C_4)} = \frac{C_1 - C_2}{C_3 - C_4} \quad (12)$$

Combining equations (11) and (12):

$$\theta = \frac{e(N_1 - N_2)}{2R(N_3 - N_4)} \quad (13)$$

After arithmetic operation unit 66 determines tilt angle $\theta$, the value is transferred to display unit 68 which indicates the measured value $\theta$.

Figure 6:
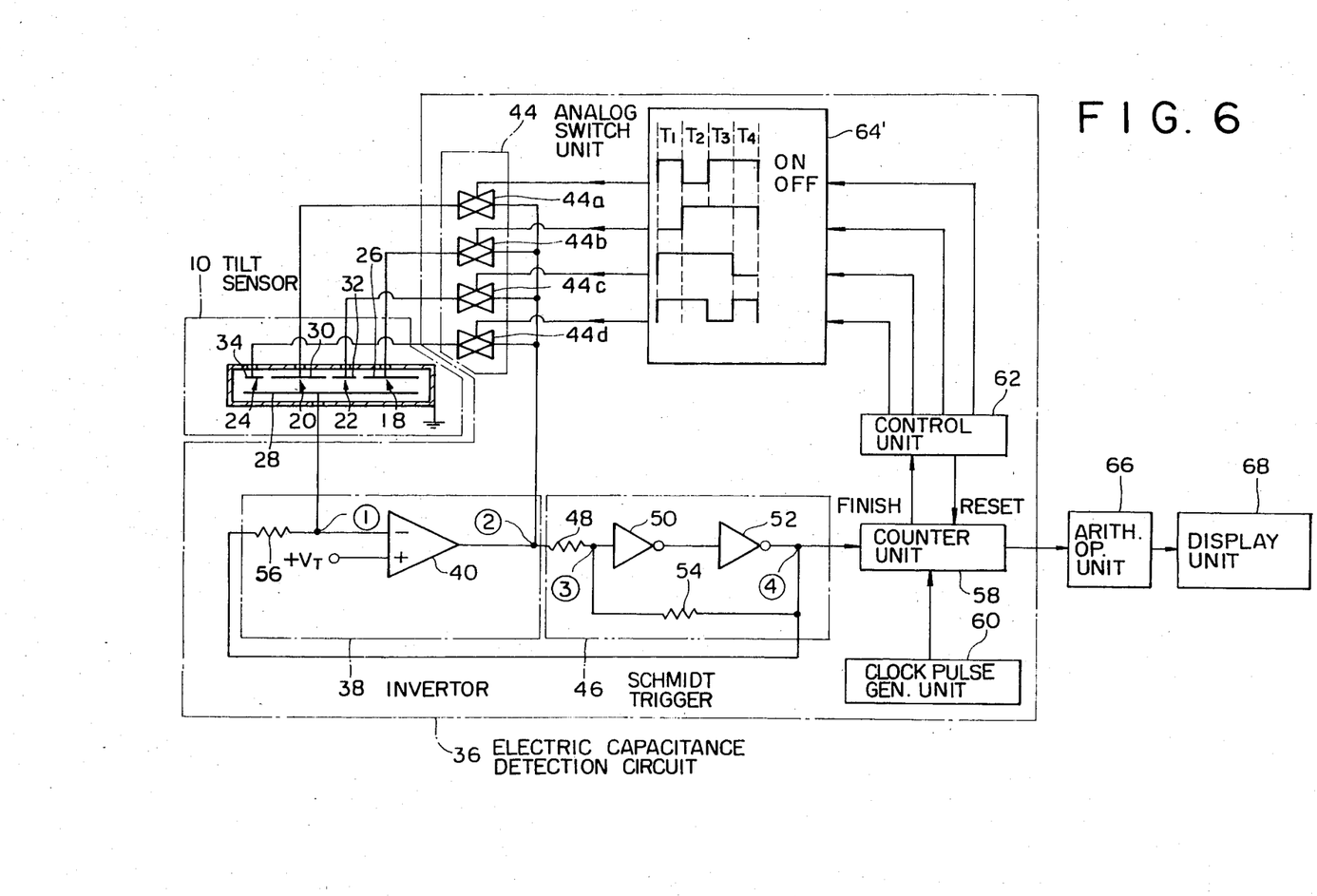
FIG. 6 illustrates a second embodiment of a signal processing circuit for the present invention.

A second signal processing embodiment is illustrated in FIG. 6. Since this embodiment is very similar to that illustrated in FIG. 4, only differences between the circuits of FIGS. 4 and 6 will be described.

As can be seen schematically at 64', control unit 62' causes different groups of three of capacitors 18 through 24 to be connected in parallel across operational amplifier 40 during four consecutive time periods. Since three of the four capacitors are connected in parallel at any given time, the capacitance across operational amplifier 40 is sufficiently high to enable elimination of capacitor 42. Thus, this embodiment of the invention is advantageous in that, among other things, even if a fixed capacitor is not connected across operational amplifier 40, the linearity of integrator circuit 38 can be maintained due to the relatively high capacitance from the connection of groups of three capacitors 18 through 24.

Further, in the case that capacitors 18 through 24 have individual electrodes opposing to electrodes 26 through 34, respectively, such individual electrodes may be connected to the inverting input of operational amplifier 40 through an analog switch unit which is the same in construction as analog switch unit 44 and is controlled in synchronizm therewith by control unit 62'.

During time period $T_1$, analog switches 44a, 44c, and 44d connect electrodes 26, 32, and 34 to the output of operational amplifier 40. Therefore, during period $T_1$, the count in counter unit 58 is as follows: $N_1 = K_2(C_1 + C_3 + C_4)$. In the same manner, during period $T_2$, counter unit 58 counts $N_2 = K_2(C_2 + C_3 + C_4)$, during period $T_3$, $N_3 = K_2(C_1 + C_2 + C_3)$ and during period $T_4$, $N_4 = K_2(C_1 + C_2 + C_4)$. With this embodiments, arithmetic operation unit 66' carries out the following operaitons:

$$\theta = \frac{e}{2R} \cdot \frac{(N_1 - N_2)}{(N_3 - N_4)} \quad (14)$$

$$= \frac{e}{2R} \cdot \frac{K_2(C_1 + C_3 + C_4) - K_2(C_2 + C_3 + C_4)}{K_2(C_1 + C_2 + C_3) - K_2(C_1 + C_2 + C_4)}$$

$$= \frac{e}{2R} \cdot \frac{C_1 - C_2}{C_3 - C_4}$$

As a result, tilt angle is determined.

In the embodiments illustrated in FIGS. 4 and 6, counter unit 58 counted the number of clock pulses from clock pulse generator unit 60 during a predetermined number of pulses from inverter 52. Instead, counter unit 58 may count the number of pulses from inverter 52 during a fixed period determined by a fixed number of clock pulses from clock pulse generator unit 60. In this situation, assume that counter unit 58 counts $n_i$ ($i = 1, 2, 3, 4$) pulses supplied from inverter 52 during a period of time when capacitance Ci is connected to integrator circuit 38. Data is inversely proportional to time periods $n_i$ of a pulse train which is supplied from inverter 52. Therefore, the following relationships are established.

$$N_1 = \frac{1}{n_1}$$

$$N_2 = \frac{1}{n_2}$$

$$N_3 = \frac{1}{n_3}$$

$$N_4 = \frac{1}{n_4}$$

$$\theta = \frac{e}{2R} \cdot \frac{(N_1 - N_2)}{(N_3 - N_4)} = \frac{e}{2R} \cdot \frac{n_3 n_4 (n_1 - n_2)}{n_1 n_2 (n_3 - n_4)} \quad (15)$$

Thus, in this embodiment also, the arithmetic operation unit can take the four measured counts, $n_1$ through $n_4$ and used these counts to determine the tilt angle $\theta$.

Figure 7:
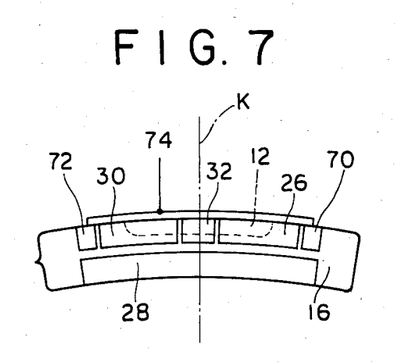
FIG. 7 is a side elevational view of a second embodiment of a container for the present invention.

In the embodiment of FIGS. 1 and 2, electrode 34 is disposed next to electrode 26 on container 16. FIG. 7 illustrates an alternative to this arrangement. In FIG. 7, instead of employing a single electrode 34, electrodes 70 and 72 are disposed adjacent electrodes 26 and 30, respectively. Electrodes 70 and 72 are electrically connected by wire 74. Wire 74 is connected to the processing circuitry in the same manner that electrode 34 is connected to the processing circuitry.

Typically, practical use limits the maximum size of container 16, and therefore limits the maximum size of the electrodes thereon. The capacitance values of capacitors formed by the electrodes are determined, in part, by the size of the electrodes. As described above, it is desirable to obtain the largest possible capacitance values.

Figure 8:
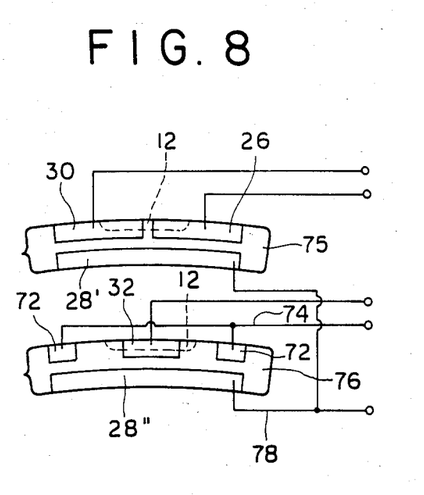
FIG. 8 is a side elevational view of containers in accordance with a third embodiment of the present invention.

The embodiment illustrated in FIG. 8 is designed to maximize electrode size. Instead of using a single container 16, the embodiment of FIG. 8 employs mechanically linked containers 75 and 76, each having bubble 12. Electrodes 26 and 30 are disposed on container 75 while electrodes 32, 70, and 72 are disposed on container 76. In this embodiment, common electrode 28 is split into electrode 28' on container 75 and electrode 28" on container 76, joined together by wire 78. Since two containers are employed to hold the electrodes, they may be larger, thus producing increased capacitances.

Although only a few preferred, exemplary embodiments of this invention have been described in detail above, those skilled in the art would readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A level detector comprising:
   a first fluid;

a second fluid immiscible with said first fluid and having a dielectric constant different from said first fluid dielectric constant;

means for containing said first and second fluids;

a first capacitor having said first and second fluids as dielectric material, the amount of said first fluid acting as dielectric material being related to the angle of said containing means;

a second capacitor having said first and second fluids as dielectric material, the amount of said first fluid acting as dielectric material being related to the angle of said containing means in a manner inverse to said first capacitor;

a third capacitor having said first and second fluids as dielectric material in a manner independent of the angle of said containing means;

a fourth capacitor having only said second fluid as dielectric material; and means for generating a signal related to the angle of said containing means based upon the capacitance of said first, second, third, and fourth capacitors.

2. A detector as in claim 1 wherein said first, second, third, and fourth capacitors each include two electrodes disposed on opposite sides of said containing means.

3. A detector as in claim 2 wherein said first fluid is a gas bubble in said second fluid.

4. A detector as in claim 3 wherein said containing means includes a container having a convex surface.

5. A detector as in claim 4 wherein said container is a portion of a toroidal tube.

6. A detector as in claim 2 wherein one of said electrodes in each of said first, second, third, and fourth capacitors is a single common electrode.

7. A detector as in claim 2 wherein said electrodes for said first and second capacitors are disposed on opposite sides of said electrodes for said third capacitor.

8. A detector as in claim 7 wherein said electrodes for said fourth capacitor are adjacent said electrodes for said second capacitor.

9. A detector as in claim 7 wherein said electrodes for said fourth capacitor include two electrode portions on the same side of said containing means, one of said portions being disposed adjacent each of said electrodes for said first and second capacitors.

10. A detector as in claim 2 wherein the distance between said two electrodes of said first through fourth capacitors is substantially constant.

11. A detector as in claim 2 wherein the electrode area defining said first capacitor is substantially equal in size to that defining said second capacitor and the electrode area defining said third capacitor is substantially equal in size to that defining said fourth capacitor.

12. A detector as in claim 1 wherein said containing means includes two containers each holding said first and second fluids, at least one of said first through fourth capacitors being disposed adjacent one of said containers and the remainder of said first through fourth capacitors being disposed adjacent the other of said containers.

13. A detector as in claim 1 wherein said generating means includes:

a capacitance controlled oscillator;

means for sequentially connecting selected ones of said first, second, third, and fourth capacitors to said oscillator to vary periods of the output signals of said oscillator;

means for determining the timings of said output signals; and means for generating a signal related to a tilt angle of said containing means from said periods.

14. A detector as in claim 13 wherein said oscillator includes an integrator and said connecting means connects said first, second, third, and fourth capacitors between an output and input of said integrator.

15. A detector as in claim 13 wherein said connecting means includes means for sequentially connecting a single one of said first, second, third, and fourth capacitors to said oscillator.

16. A detector as in claim 15 wherein said timings determining means includes:

fixed frequency generating means for generating clock pulses; and means for counting said clock pulses during the production of a predetermined number of pulses from said oscillator.

17. A detector as in claim 16 wherein said angle signal generating means generates a signal related to tilt angle $\theta = K(N_1 - N_2)/(N_3 - N_4)$, where K is a constant and $N_1$, $N_2$, $N_3$, and $N_4$ represent values from said timings determining means related to the output signals of said oscillator when said first, second, third, and fourth capacitors are respectively connected to said oscillator.

18. A detector as in claim 13 wherein said connecting means includes means for sequentially connecting different groups of three of said first, second, third, and fourth capacitors at a time to said oscillator.

19. A detector as in claim 18 wherein said timings determining means includes:

fixed frequency generating means for generating clock pulses; and means for counting said clock pulses during the production of a predetermined number of pulses from said oscillator.

20. A detector as in claim 19 wherein said angle signal generating means generates a signal related to tilt angle $\theta = K(N_1 - N_2)/(N_3 - N_4)$, where K is a constant and $N_1$ represents the output of said timings determining means when said connecting means connects said first, third, and fourth capacitors to said oscillator, $N_2$ represents the output of said timings determining means when said connecting means connects said second, third, and fourth capacitors to said oscillator, $N_3$ represents the output of said timings determining means when said connecting means connects said first, second, and third capacitors to said oscillator and $N_4$ represents the output of said timings determining means when said connecting means connects said first, second, and fourth capacitors to said oscillator.

21. A detector as in claim 13 wherein said timings determining means includes:

a fixed frequency clock pulse generator; and means for counting pulses from said oscillator during a fixed period determined by a predetermined number of said clock pulses.

22. A detector as in claim 21 wherein said angle signal generating means generates a signal related to tilt angle $\theta = K(n_3 n_4(n_1 - n_2))/(n_1 n_2(n_3 - n_4))$ where K is a constant, $n_1$, $n_2$, $n_3$ and $n_4$ represent the count determined by said counting means when said first, second, third, and fourth capacitors are respectively connected to said oscillator.

23. A level detector comprising:

a first fluid;

a second fluid immiscible with said first fluid and having a dielectric constant different from said first fluid dielectric constant;

means for containing said first and second fluids;
a common electrode disposed on one side of said containing means;
a first electrode disposed on an opposite side of said containing means from said common electrode, said first and second fluids being disposed between said first electrode and said common electrode as a dielectric material, the amount of said first fluid acting as dielectric material being related to the angle of said containing means;
a second electrode disposed on said opposite side of said containing means, said first and second fluids being disposed between said second electrode and said common electrode as dielectric material, the amount of said first fluid acting as dielectric material being related to the angle of said containing means in a manner inverse to said first electrode and said common electrode;
a third electrode disposed on said opposite side of said containing means, said first and second fluids being disposed between said third electrode and said common electrode as dielectric material in a manner independent of the angle of said containing means;
a fourth electrode disposed on said opposite side of said containing means, only said second fluid being disposed between said fourth electrode and said common electrode as dielectric material;
said first and second electrodes being disposed on opposite sides of said third electrode;
the distance between said common electrode and one of said first, second, third and fourth electrodes being substantially constant;
the area of said first electrode being substantially equal in size to that of said second electrode;
the area of said third electrode being substantially equal in size to that of said fourth electrode; and
means for generating a signal related to the angle of said containing means based upon capacitances between selected combinations of said first, second, third, and fourth electrodes and said common electrode.

24. A level detector comprising:
a first fluid;
a second fluid immiscible with said first fluid and having a dielectric constant different from said first fluid dielectric constant;
means for containing said first and second fluids;
a common electrode disposed on one side of said containing means;
a first electrode disposed on an opposite side of said containing means from said common electrode, said first and second fluids being disposed between said first electrode and said common electrode as a dielectric material, the amount of said first fluid acting as dielectric material being related to the angle of said containing means;
a second electrode disposed on said opposite side of said containing means, said first and second fluids being disposed between said second electrode and said commond electrode as dielectric material, the amount of said first fluid acting as dielectric material being related to the angle of said containing means in a manner inverse to said first electrode and said common electrode;
a third electrode disposed on said opposite side of said containing means, said first and second fluids being disposed between said third electrode and said common electrode as dielectric material in a manner independent of the angle of said containing means;
a fourth electrode disposed on said opposite side of said containing means, only said second fluid being disposed between said fourth electrode and said common electrode as dielectric material;
said first and second electrodes being disposed on opposite sides of said third electrode;
the distance between said common electrode and one of said first, second, third and fourth electrodes being substantially constant;
the area of said first electrode being substantially equal in size to that of said second electrode;
the area of said third electrode being substantially equal in size to that of said fourth electrode;
a capacitance controlled oscillator;
means for connecting selected ones of said first, second, third, and fourth electrodes to said oscillator to vary the timings of the output signals of said oscillator;
means for determining the timings of said output signals when said selected ones of first, second, third, and fourth electrodes are connected to said oscillator; and
means for generating a signal related to the angle of said container from said timings.

* * * * *